US005088188A

United States Patent [19]

Riou

[11] Patent Number: 5,088,188

[45] Date of Patent: Feb. 18, 1992

[54] METHOD AND MACHINE FOR THE AUTOMATIC LAYING OF INTERPOSED JOINTS BETWEEN THE ELEMENTS OF A MULTIPLE GLAZING

[75] Inventor: Pierre Riou, Pont-Audemer, France

[73] Assignee: Vitrages Isolants De Pont Audemer, France

[21] Appl. No.: 542,306

[22] Filed: Jun. 22, 1990

[51] Int. Cl.[5] ........ B23P 21/00

[52] U.S. Cl. ........ 29/787; 29/709; 29/783; 156/107

[58] Field of Search ........ 29/700, 787, 771, 783, 29/789, 709; 414/225, 412, 792.9, 793; 83/879, 880, 886, 486; 156/107, 556, 558, 559, 512, 517

[56] References Cited

U.S. PATENT DOCUMENTS

| | | | |
|---|---|---|---|
| 3,876,489 | 4/1975 | Chenel | 156/107 X |
| 4,088,522 | 5/1978 | Mercier et al. | 156/107 |
| 4,228,886 | 10/1980 | Moran | 414/793 X |
| 4,248,656 | 2/1981 | Hofmann | 156/107 X |
| 4,295,920 | 10/1981 | Bovone | 414/792.9 X |
| 4,743,336 | 5/1988 | White | 156/107 X |
| 4,769,105 | 9/1988 | Lisec | 156/107 X |
| 4,961,816 | 10/1990 | Lisec | 156/107 X |

FOREIGN PATENT DOCUMENTS

| | | | |
|---|---|---|---|
| 0158766 | 2/1983 | Fed. Rep. of Germany | 156/107 |
| 0014278 | 2/1977 | Japan | 29/771 |

*Primary Examiner*—Timothy V. Eley
*Assistant Examiner*—C. Richard Martin
*Attorney, Agent, or Firm*—Ostrolenk, Faber, Gerb & Soffen

[57] ABSTRACT

Machine for the automatic laying of interposed joints for the production of a multiple glazing. It consists essentially of an air-cushion table (200) of a length equal to at least twice the greatest length of transformable glazings, with respect to which a maneuvering carriage (40) slides on which there are fastened retractable stops (46), jacks (47) with suction cups (48) and proximity detectors (49); on one of the sides of which table there are arranged lateral reference rollers (11); above which table and approximately in its middle there is fastened a transverse gantry (120) serving as support for a movable carriage (123) supporting a laying head (60) of adjustable height and orientation; above the second half of which table there is fastened a second gantry (130) supporting jacks (131) with suction cups (132) assuring the momentary lifting of one glazing during the placing of the joint on the other; and on the sides of which table there are fastened a device for the removal of the protective film from the joint (8) before the putting in place of the joint, a motorized unwinder (90) of the spool (91) on which the joint (8) is wound, a device for the cutting of the joint (8), and a feed blower (30) for the air cushion.

34 Claims, 6 Drawing Sheets

METHOD AND MACHINE FOR THE AUTOMATIC LAYING OF INTERPOSED JOINTS BETWEEN THE ELEMENTS OF A MULTIPLE GLAZING

BACKGROUND OF THE INVENTION

The present invention relates to a method and machine for the automatic laying of interposed joints upon the production of multiple glazing.

Before they are mounted in the frames intended to receive them, multiple glazings require that the elements of the glazing be separated by a lateral joint which assures both water-tightness and the spacing of the glass panes. Multiple glazings formed in this manner are then subjected to a pressing-calibrating operation intended to bring them to a given thickness which corresponds to the width of the rabbet of the frames intended to receive them.

Up to now, the undulated armature joint assuring the water-tightness and spacing of the elements of the multiple glazings was put in place at the edge of the glazings manually by means of an applicator. This resulted in a certain irregularity and a loss of time which was incompatible with the automating of the other phases of development of the multiple glazings.

SUMMARY OF THE INVENTION

An object of the present invention is to overcome these drawbacks by providing a method and a machine for the automatic applying of the joint on the edge of the glazing, using the spool on which it is packed by the manufacturer, with automatic cutting at the end of the application and return to the initial position.

The method of the invention for the automatic application of the intermediate joints between the elements of a multiple glazing consists in assuring, first of all, the flat passing of a first pane and then, after it has traveled over a distance at least equal to its length, raising and temporarily holding it at a certain distance from the plane of travel, causing a second pane of the same dimension as the first to pass, applying the interposed joint longitudinally during the travel of the second pane and transversely when the travel has been effected, and effecting the automatic cutting of the joint when it arrives flush with the end thereof, in order to obtain a continuous bead, then displacing the second pane in translation until it arrives exactly below the first, bringing the first pane to rest against the joint arranged on the second pane, then directing the double-pane thus formed towards a device for calibrating the joint, or recycling it for the putting in place of a third pane, proceeding as indicated above, when it is desired to obtain a triple glazing, or of another double glazing when it is desired to obtain a quadruple glazing.

The machine in accordance with the invention which permits the carrying out of the process described above is characterized by the fact that it is formed essentially of an air-cushion table of a length at least equal to twice the greatest length of transformable panes, below which a maneuvering carriage on which retractable stops, suction-cup jacks and proximity detectors are fastened slides; on one of the sides of which table lateral reference rollers are arranged; above which table and approximately at its center there is fastened a transverse gantry serving as support for a movable carriage supporting a laying head of adjustable height and orientation; above the second half of which table there is fastened a second gantry supporting suction-cup jacks assuring the momentary additional lifting of a pane during the placing of the joint on another pane; and on the sides of which table there are fastened a device for withdrawing the protective film from the joint before the putting in place of the joint, a motorized unwinder, a device for cutting the joint, and a feed blower for the air cushion.

The top of the table is formed of a plurality of longitudinal caissons in communication with the delivery conduit of the blower and the upper wall of which, provided with a covering of felt, is provided with a large number of small, uniformly distributed orifices.

The carriage which bears the retractable stops, the suction-cup jacks and the proximity detectors slides on two slideways located below the table, by means of a geared motor and a pinion-rack system.

The retractable stops, the suction-cup jacks and the proximity detectors move, preferably at the rate of one retractable stop, two suction-cup jacks and one proximity detector, in each of the grooves provided for this purpose between the longitudinal caissons assuring the cushion of air.

The device for adjusting the height and orientation of the head for the placing of the joint with respect to its support carriage is formed by a plate which is displaceable along a vertical axis via a slide-way and two slides under the effect of a screw and nut system moved by a stepping motor on which the device for the orienting and indexing of the joint-laying head is fastened.

The device for the orienting and indexing of the joint-laying head is formed of a shaft which is mounted on two bearings, the rotation of which is effected by a rotary jack and the indexing of which is assured by a pointer moved by a jack and by conical indentations arranged at an angle of 90° apart, developed on the shaft.

The joint-laying head is formed of a base on which there are fastened a vertical positioning detector and two lateral positioning detectors with respect to the glazing and an applicator-guide for the joint.

The base of the laying head is mounted for sliding on its operating shaft, towards the lower end of which it is continuously urged by a spring.

The applicator guide comprises primarily a guide formed of a conduit which flares slightly outward towards the entrance along a section homothetic to that of the joint, and to the upper part of which there is fastened an adjustable-stroke roller applicator pulled back by a spring.

The flared conduit which assures the guiding of the joint is subjected on its inside to a jet of air which maintains the joint in the axis of symmetry of said conduit.

The device for the withdrawal of the film protecting the joint is formed of a roller, the shaft of which is urged towards the shaft of the unwinder by springs.

The laying head is preceded by a buffer reservoir which absorbs the stops and starts of the motor of the unwinder in accordance with the orders received by two photoelectric detectors and two position switches with flexible rods which assure the safety stops.

The buffer reservoir is formed of a plurality of small rollers, acted on bý springs, assuring the joint a meandering path of variable amplitude as a function of the tension exerted on the joint.

The device for the cutting of the joint cónsists of the combination of a cutting blade and a jack.

The advantages inherent in the use of the method and machine of the invention reside essentially in the fact that the entire process of manufacture of a multiple glazing can be automated from the lifting of the elements of the glazing up to the pressing-calibrating of the multiple glazings before their insertion in their frame, which results in a gain in productivity, a reduction in the cost of labor, and a better quality of the positioning of the interposed joint.

Other characteristics and advantages of the present invention will become evident from a reading of the following description of a machine for the automatic laying of the intermediate joint of double glazings in accordance with the invention, shown in the accompanying drawing by way of illustration and not of limitation.

DETAILED DESCRIPTION

Figure 1:
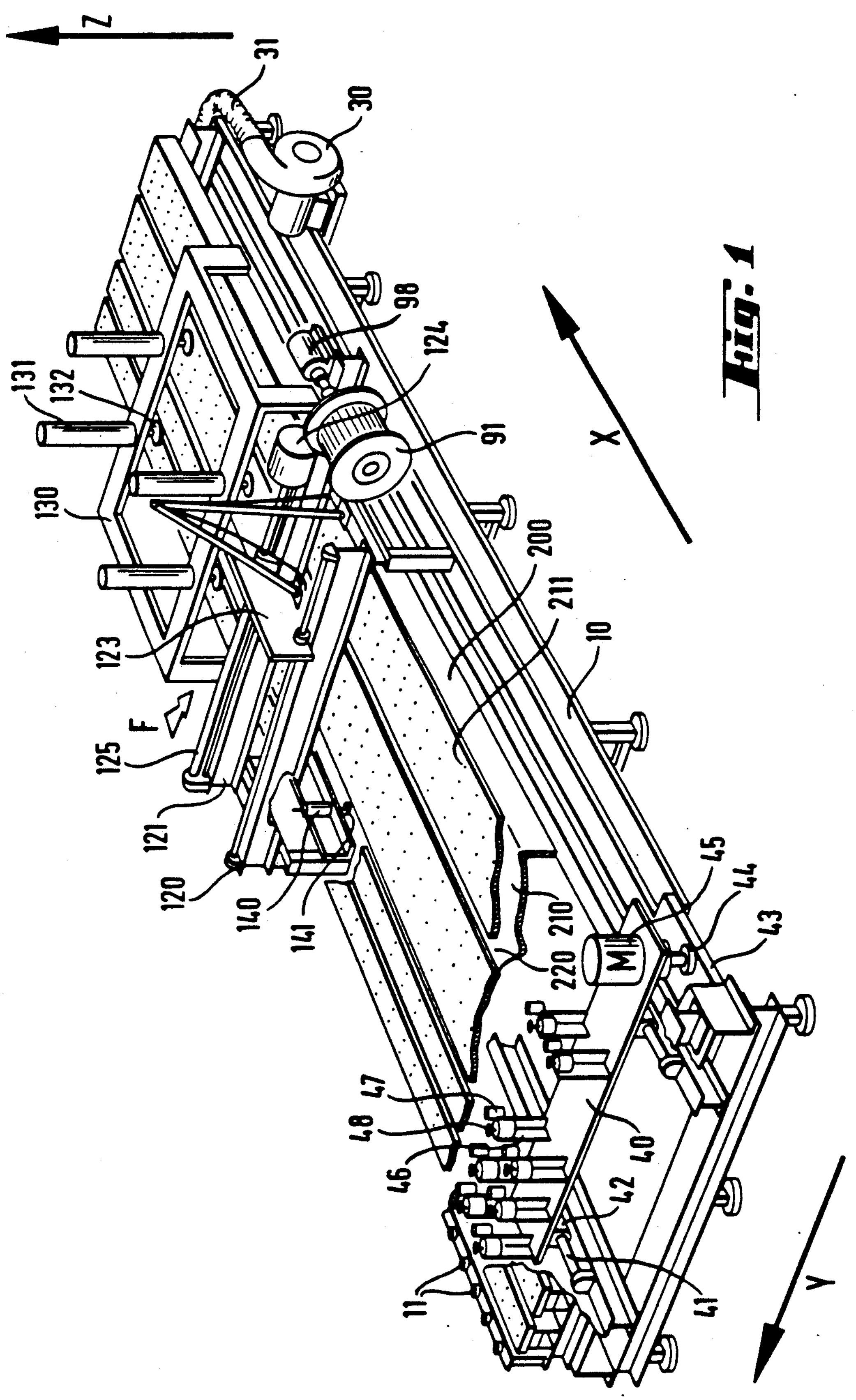
FIG. 1 is a perspective view of a laying machine in accordance with the invention.
Figure 7:
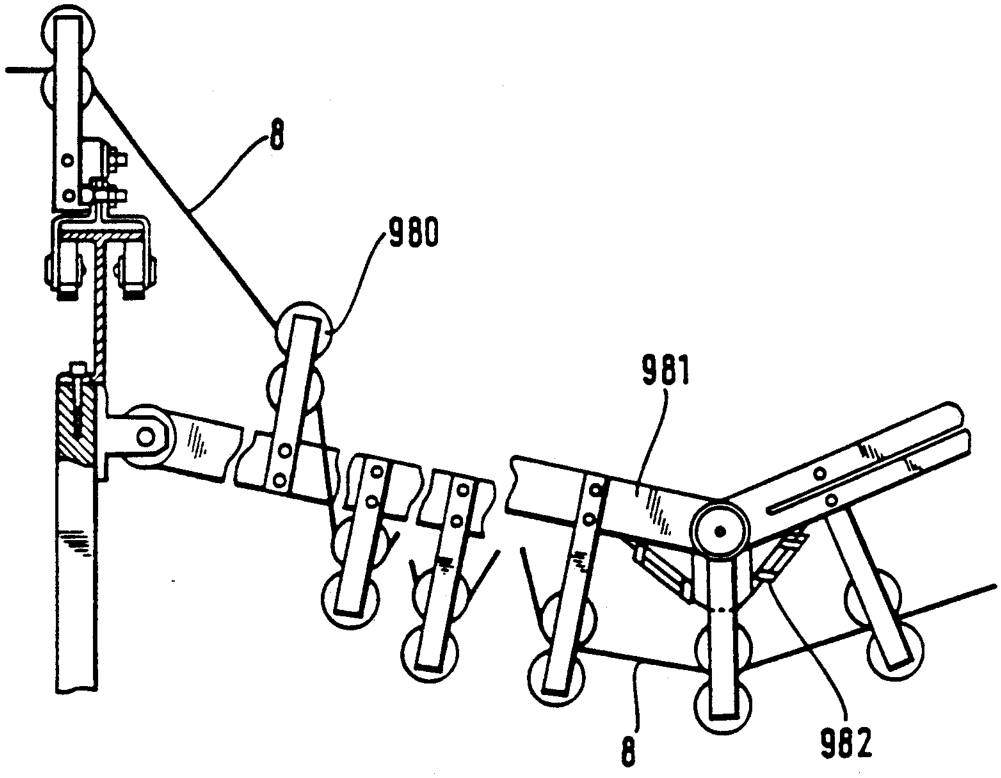
FIG. 7 is a top view of the buffer reservoir which regulates the speed of passage of the joint.
Figure 8:
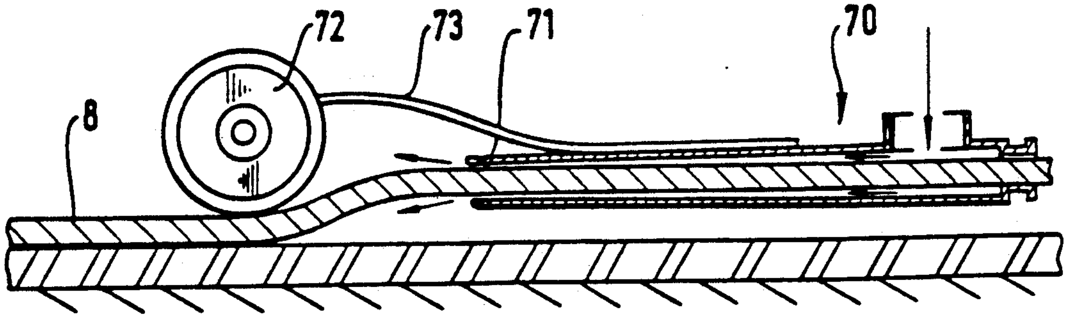
FIG. 8 is a diagrammatic view in section of the roller applicator.
Figure 5:
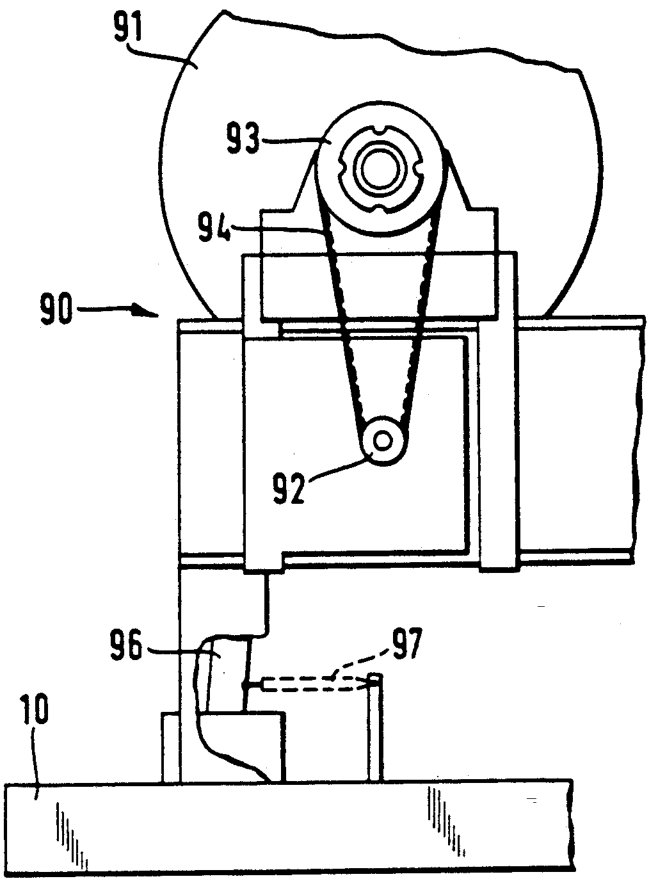
FIG. 5 is a detailed sideview of the unwinder equipped with a system for removing the protective film from the joints.
Figure 6:
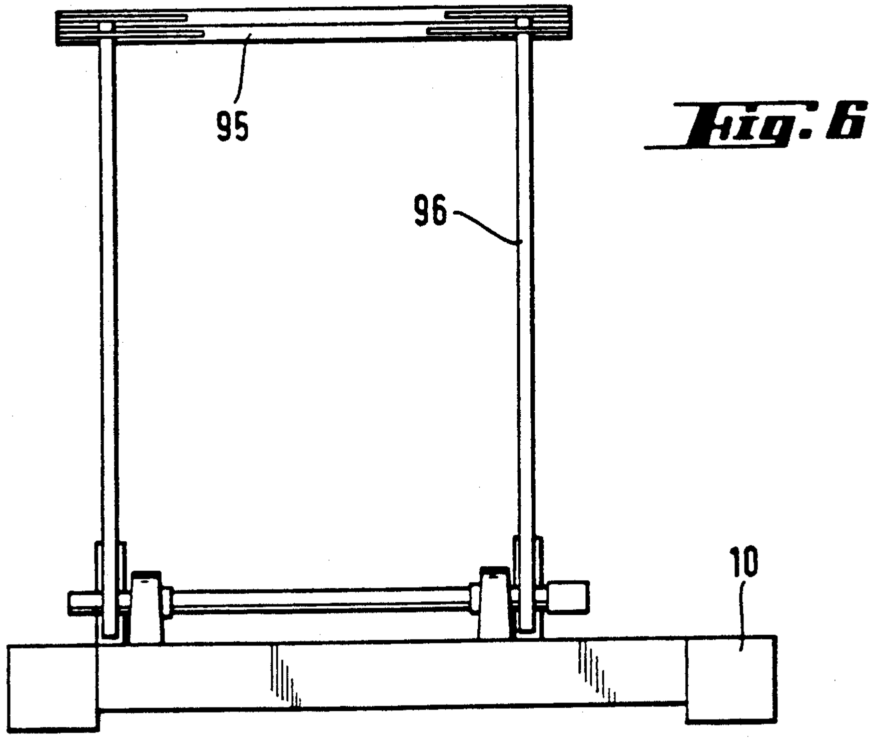
FIG. 6 is a front view of the system for the removal of the protective film from the joints.

Referring to these figures, it is seen that the machine of the invention is formed primarily (FIG. 1) of a frame 10 bearing a table 200 formed of several longitudinal caissons 210 separated by grooves 220 and pierced by a plurality of orifices 211, in communication with the delivery conduit 31 of a blower 30; a maneuvering carriage 40 which is movable in translation on slideways 41 via slides 42, and a rack 43 and pinion 44 system driven by a geared motor 45, said maneuvering carriage bearing retractable stops 46, suction-cup jacks 48 and proximity detectors 47, lateral reference rollers 11; a central gantry 120 (FIG. 2) having slideways 121 on which, via ball sleeves 122, a carriage 123 slides, moved by a screw 125 driven by a motor 124, said carriage 123 supporting (FIG. 3), via a slideway 151, two slides 126 and 127 and a nut 128-screw 129 system and stepping motor 150, a plate 50 on which there is fastened a device for the orienting and indexing of the laying head 60 (FIGS. 3 and 4), formed essentially of a shaft 510 supported by two bearings 52 and 53, the rotation of which is assured by a rotary jack 54 and the indexing of which is effected via an indexing finger at 55, moved by a jack 56, and conical indentations 511 made in the shaft 510 and arranged at an angle of 90° apart; a laying head 60 formed of a base 61, which is urged towards the end of the shaft 510 by a spring 512, supporting a vertical positioning detector 62, two lateral positioning detectors 63 and an applicator guide 70 for the joint 8, formed essentially of a conduit 71 which flares out slightly towards the entrance and on which an applicator roller 72 acted on by a spring 73 is fastened; an unwinder 90 (FIG. 5), a spool 91 driven in rotation by a geared motor 98 and two pinions 92 and 93 which are connected by a notched belt 94; a device for removing the protective film from the joint 8 (FIG. 6) formed of a roller 95 the shaft of which is urged towards that of the unwinder 90 via arms 96 acted on by springs 97; a buffer reservoir (FIG. 7) absorbing the stops and restarts of the unwinder 90, and formed of a plurality of rollers 980 mounted on arms 981 which are urged towards each other by springs 982; a second gantry 130 bearing jacks 131 with suction cups 132, and a joint cutting device formed of a jack 140 associated with a blade 141.

The operation of the device of the invention is as follows:

The pane of glass (or double pane in the case of the production of a triple glazing) is first of all placed (FIGS. 1 and 2) on the upstream end of the table 200, blowing stopped, jacks 47 with suction cup 48 in retracted position, the retractable stops 46, which exceed the width of the glazing, are retracted until the glazing now rests only on two points, when it has been brought against the lateral reference rollers 11. The suction cups 48 of the jacks 47 are then brought against the glazing and the air pressure is established in the caissons 210 so as to obtain a supporting of the glazing by the jets of air emerging from the orifices 211 and thus facilitate the sliding of said glazing on the felt covering of the table under the action of the suction cups 48 which are driven by the displacement of the maneuvering carriage 40 under the action of the geared motor 45.

Figure 2:
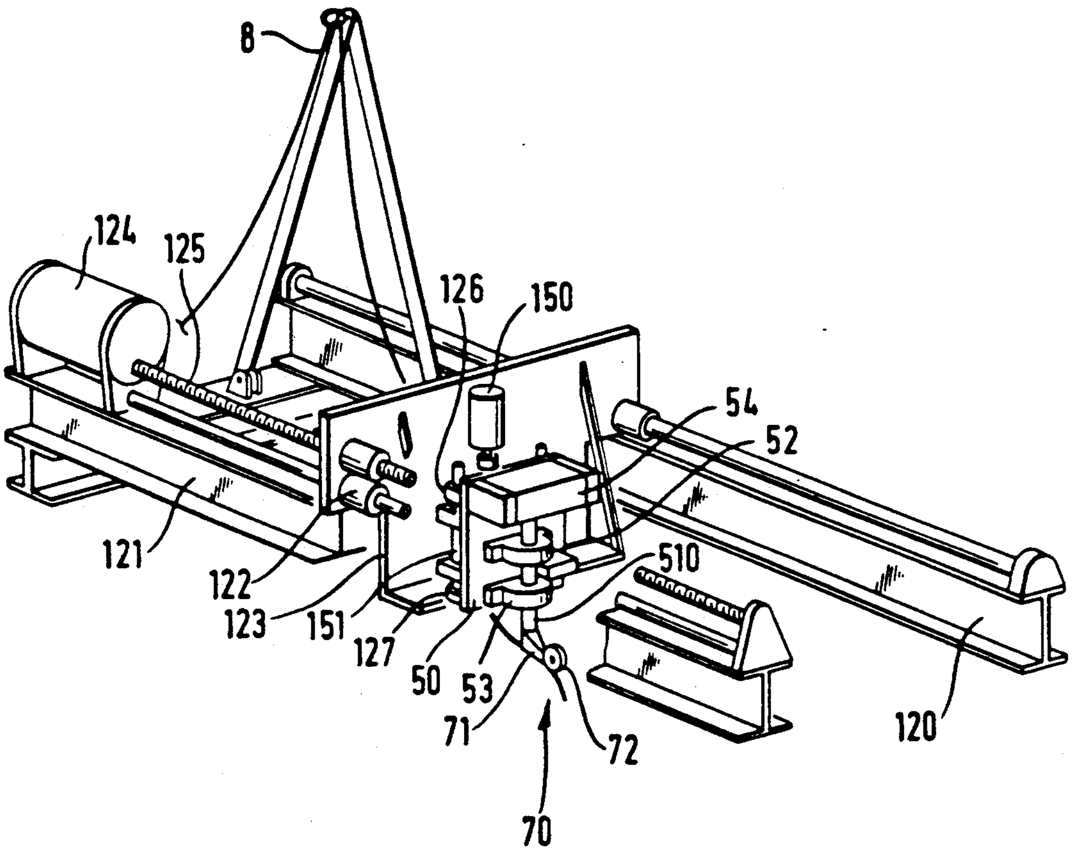
FIG. 2 is a partial perspective view, in the direction indicated in FIG. 1 by the arrow F, of the device which assures the transverse and vertical displacement of the laying head for the joint.
Figure 3:
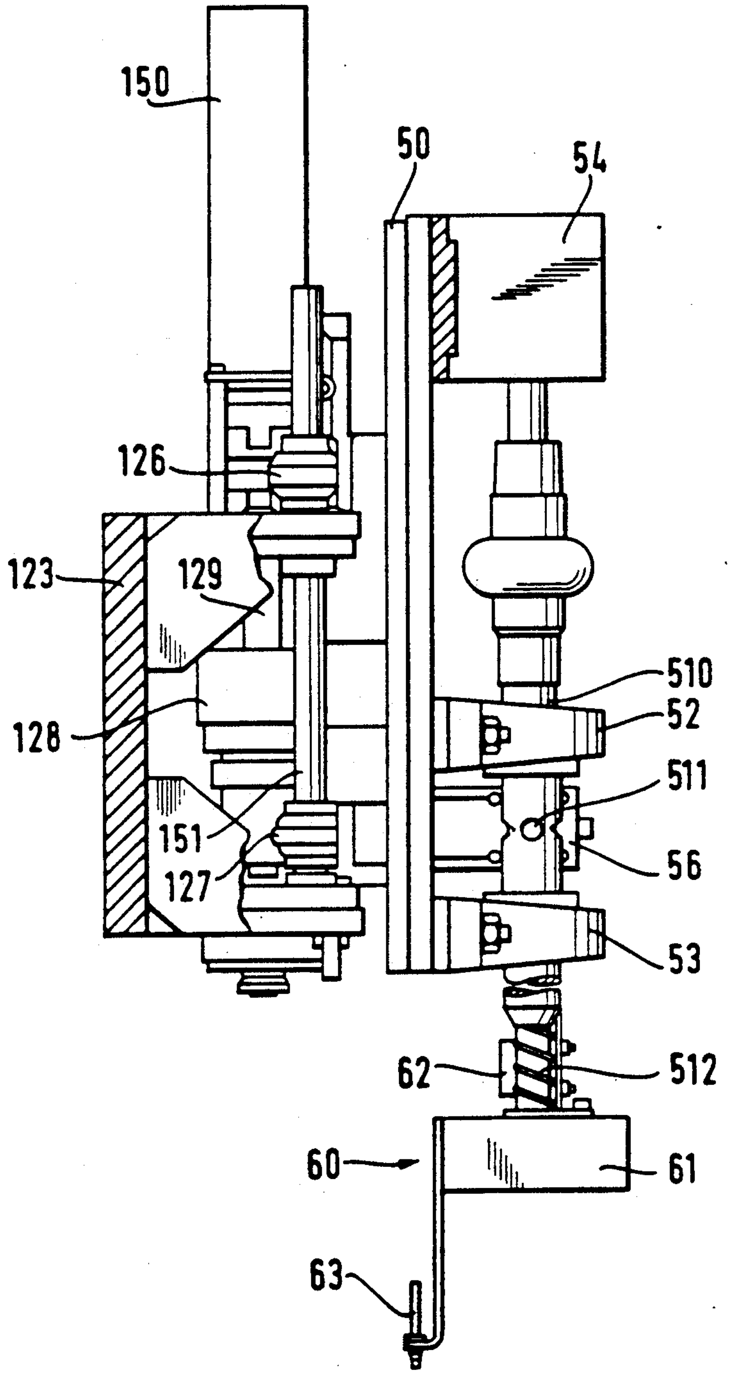
FIG. 3 is a detailed side view of the device assuring the vertical displacement and orientation of the laying head.
Figure 4:
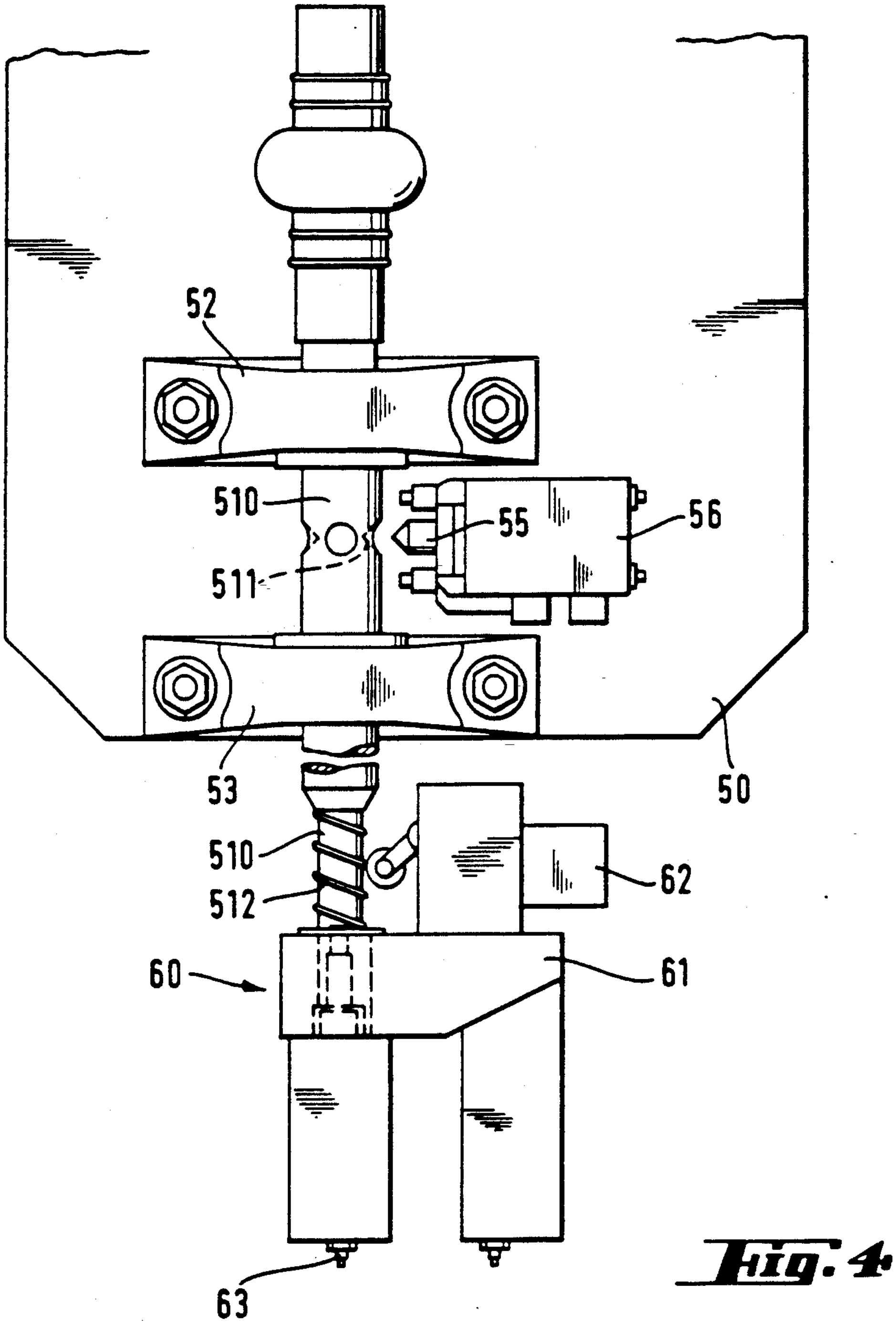
FIG. 4 is a front view of the device assuring the vertical displacement and orientation of the laying head.

Referring to FIGS. 2, 3 and 4, it is clear that the glazing can easily be displaced longitudinally, the operation of applying the joint can be effected by the laying head 60, due to its possibilities of displacement along the axes Y and Z and its orientability via, respectively, the motor 124 assuring the displacement of the carriage 123, the stepping motor 150 assuring the vertical positioning of the laying head 60 via screw 129 and nut 128, the plate 50 and the rotary jack 54 assuring the rotation of the shaft 510. The 90° rotations of the laying head 60 required for the laying of the joint in the corners are controlled by the indexing finger 35 and the indentations 511 provided in the drive shaft 510.

The end of stroke along one of the sides of the glazing is detected first of all by one of the detectors 63, fastened below the head 60, which causes a deceleration of the movement, the second detector controlling the stopping of the displacement. This stopping permits the rotary jack 54 to pivot the laying head 60 by 90° so as to permit the continuation of the laying of the joint on the adjacent side of the glazing, the first detector, which has assured the slowing down of the movement, being again placed under stress due to its again coming into contact with the glazing. As soon as the four corners of the glazing have been covered by the joint 8, the joint can be cut by the cutting jack 140 as soon as the blade 141 arrives precisely at the end of said joint 8.

During these operations of the placing of the joint 8, the relative accelerations and decelerations of the laying head 60 with respect to the glazing as well as the stoppages necessary for the reorienting of the laying head in the corners are absorbed by the buffer reservoir which, as a function of the variations in tension exerted on the joint, assures a corresponding absorption or release of the length of joint by the action of the rollers 980 and the articulation of the arms 981 which bear them.

The joint 8 being delivered on a spool, and taking into account the coefficient of adherence of the latter, it is, when packed on a spool, separated at each turn by a film of a material which avoids any direct contact with the portion of joint constituting the preceding turn. This film is automatically eliminated via the device shown in FIGS. 5 and 6, consisting of a roller 95 which is brought against the hub of the spool 91 by the spring 97.

In one advantageous variant of the machine according to the invention, the spool 91, instead of being fixed, is mounted for movement in lateral translation and in rotation around a vertical axis so as to follow the displacement of the carriage 123 and the 90° rotation of the laying head, its rotation by 90° around the vertical axis taking place concomitant with that of the laying head.

As to the glazing or double-glazing which thus receives a joint by the method described above, it can, after having been stopped at the rear of the table by the stopping of the air cushion and of the drive carriage 40, be fastened to another glazing, which is waiting, upon a simple passage over the table without laying a joint, below the second gantry 130: It is sufficient to actuate the jacks 131 with suction cups 132 so that this glazing comes to rest on the joint previously laid on the immobilized glazing on the table. This operation being carried out, the double, triple or quadruple glazing can be evacuated, after return of the rod of the jacks 131, and directed towards a joint pressing and calibrating device.

It goes without saying that the present invention is not limited to the above description of one of its embodiments and that it is capable of experiencing a number of changes without thereby going beyond the scope of the invention.

Thus, the laying head of the joint can be provided with a cooling system which facilitates the laying thereof.

I claim:

1. Apparatus for automatically placing flexible joint material between panes of a multiple glazing during the producing of the multiple glazing, comprising:

an air-cushion table of a length equal to at least twice the greatest length of a pane of the glazing;

a maneuvering carriage movable with respect to the air-cushion table, on which there are fixed retractable stops, first extensible means having suction cup means at end thereof for engaging and lifting a pane of the glazing and proximity detectors;

a plurality of lateral reference rollers arranged along a side of the table for guiding a pane of the glazing;

a movable carriage supporting a joint material laying head;

a first transverse gantry above a first portion of the table and approximately in the middle thereof for supporting the movable carriage supporting the laying head, said laying head being adjustable in height and in orientation;

a second gantry being disposed above a portion of the table and being provided with second extensible means having suction cups at ends thereof for holding a pane of said glazing above the table and for placing a pane of glazing on another pane on which joint material has been placed by said laying head;

means disposed adjacent the table for removing a protective film from the joint material before the joint material is disposed in place on a pane of the glazing;

unwinder means for unwinding a spool on which the joint material is wound;

means for cutting the joint material from the spool; and blower means for supplying pressurized air to said air-cushion table for reducing friction of the panes of said glazing with the table.

2. The apparatus recited in claim 1, wherein the table has a top, the top of the table being formed of several longitudinal caissons in communication with a delivery conduit of the blower, said table top having an upper wall surface provided with a soft covering, said table top being provided with a multitude of small, uniformly distributed orifices.

3. The apparatus recited in claim 1, wherein the maneuvering carriage supporting the retractable stops, first extensible means with suction cups and the proximity detectors is slidable on two slideways located under the table, the maneuvering carriage being driven by a motor through a rack and pinion system.

4. The apparatus recited in claim 1, wherein the retractable stops, first extensible means with suction cups and the proximity detectors move in grooves in the table top between the longitudinal caissons.

5. The apparatus recited in claim 4, wherein the retractable stops, the first extensible means with suction cups and the proximity detectors move such that one retractable stop, two extensible means and one proximity detector are disposed in each of the grooves provided between the longitudinal caissons.

6. The apparatus recited in claim 4, further comprising means for adjusting the height and orientation of the joint material laying head with respect to the movable carriage supporting the joint material laying head, said means for adjusting comprising a plate displaceable along a vertical axis via a slideway and two slides sliding on said slideway, said plate being driven by a screw and nut engaging the screw, the screw moved by a motor, said plate having further disposed thereon means for orienting and indexing the joint material laying head.

7. The apparatus recited in claim 6, wherein the device for orienting and indexing the joint material laying head comprises a shaft mounted on two bearings, a rotary drive means being provided for rotating the shaft, and indexing means being provided for indexing the shaft, the indexing means comprising an indexing finger moved by a further drive means, and further comprising conical indentations arranged at an angle of 90° apart on the shaft.

8. The apparatus recited in claim 1, wherein the joint material laying head comprises a base on which there are fastened a vertical positioning detector and two lateral positioning detectors with respect to the glazing and an applicator guide for the joint material.

9. The apparatus recited in claim 8, wherein the base of the joint material laying head is slidably mounted on an operating shaft, said joint material laying head being urged by a spring toward an end of the shaft.

10. The apparatus recited in claim 8, wherein the applicator guide comprises a conduit which flares out slightly towards an entrance along a section parallel to the joint material and having at an end opposite the entrance a roller applicator of adjustable stroke, urged by a spring against the joint material.

11. The apparatus recited in claim 10, wherein the flared conduit assuring the guiding of the joint material is subjected on the inside to a jet of air which maintains the joint material substantially in an axis of symmetry of said conduit.

12. The apparatus recited in claim 1, wherein the means for removing the protective film from the joint material comprises a roller having an axis urged towards an axis of the unwinder means by spring means.

13. The apparatus recited in claim 1, further comprising a buffer reservoir for absorbing stops and starts of the motor driving the unwinder means in accordance with signals received from two photoelectric detectors and two position switches.

14. The apparatus recited in claim 13, wherein the buffer reservoir is formed of a plurality of rollers biased by springs which create a sinusoidal path of variable amplitude for the joint material as a function of the tension exerted on the joint material.

15. The apparatus recited in claim 1, wherein the means for cutting the joint material comprise a blade actuated by a drive means.

16. Apparatus for automatically disposing flexible joint material between panels of a multiple glazing comprising:

table means disposed in a horizontal plane capable of receiving the panels of said glazing, said table means having a length at least equal to twice the greatest length of a panel of the glazing;

first carriage means movable with respect to the table means for moving a panel of the glazing longitudinally along said table means, said first carriage means having disposed thereon fixed retractable stop members and first vertically movable means having means for holding a panel of the glazing above the table means;

guide means disposed on the table means for guiding a panel of the glazing disposed on the movable carriage;

a first transverse gantry disposed above said table means, said first gantry supporting a movable second carriage means, the second movable carriage means having disposed thereon a joint material placing means for placing joint material on a panel of the glazing, said joint material placing means being movable vertically and being rotatable with respect to a panel of said glazing disposed on said table means;

a second gantry disposed above said table means adjacent said first gantry and being provided with second vertically movable means having means for receiving and handling a panel of said glazing;

said first carriage means comprising means for moving a panel of glazing sequentially to positions below said first and second gantries;

means disposed adjacent the table means for providing a supply of the joint material to the first gantry;

said first gantry comprising means for moving said joint material placing means in a direction perpendicular to a direction of movement of said first carriage means, and means for rotating said joint material placing means to enable formation of corners of said joint material on a panel of the glazing;

said second gantry being provided to raise a first panel of said glazing above another panel of glazing disposed on the first carriage means and having said joint material disposed thereon and for placing said first panel on said other panel having said joint material disposed thereon for forming said multiple glazing.

17. The apparatus recited in claim 16, further comprising means disposed adjacent the table means for removing a protective film from the joint material prior to placing said joint material on said panel.

18. The apparatus recited in claim 16, further comprising proximity detectors disposed on said table means for determining if a panel of said multiple glazing is disposed on said table means.

19. The apparatus recited in claim 18, wherein the first carriage means is slidable on two slideways located under the table means, the first carriage means being driven by a motor means.

20. The apparatus recited in claim 19, wherein the retractable stops and vertically movable means move in grooves in the table top between the longitudinal caissons.

21. The apparatus recited in claim 20, wherein the retractable stops, the vertically movable means and proximity detectors move such that one retractable stop, two vertically movable means and one proximity detector are disposed in each of the grooves provided between the longitudinal caissons.

22. The apparatus recited in claim 20, further comprising means for adjusting the height and orientation of the joint material placing means with respect to the second movable carriage supporting the joint material placing means, said means for adjusting comprising a plate displaceable along a vertical axis via a slideway and two slides sliding on said slideway, said plate being driven by a screw and nut engaging the screw, the screw moved by a motor, said plate having further disposed thereon means for orienting and indexing the joint material placing means.

23. The apparatus recited in claim 22, wherein the means for orienting and indexing the joint material placing means comprises a shaft mounted on two bearing, a rotary drive means being provided for rotating the shaft, and indexing means being provided for indexing the shaft, the indexing means comprising an indexing finger moved by a further drive means, and further comprising conical indentations arranged at an angle of 90° apart on the shaft.

24. The apparatus recited in claim 16, wherein said supplying means comprises a spool adapted to receive said joint material thereon and a drive means for unwinding said spool, and further comprising means for cutting the joint material dispensed from said supplying means.

25. The apparatus recited in claim 24, wherein the means for cutting the joint material comprise a blade actuated by a drive means.

26. The apparatus recited in claim 16, wherein the table means comprises an air cushion table having a top, the top of the table being formed of several longitudinal caissons having grooves therebetween, the caissons in communication with a delivery conduit of a blower, said table top having an upper surface provided with a soft covering, said table top; being provided with a multitude of small, uniformly distributed orifices.

27. The apparatus recited in claim 16, wherein the joint material placing means comprises a base on which there are fastened a vertical positioning detector and two lateral positioning detectors with respect to the glazing and an applicator guide for the joint material.

28. The apparatus recited in claim 27, wherein the base of the joint material placing means is slidably mounted on an operating shaft, said joint material placing means being urged by a spring toward an end of the shaft.

29. The apparatus recited in claim 27, wherein the applicator guide comprises a conduit which flares out slightly towards an entrance along a section parallel to the joint material and having at an end opposite the entrance a roller applicator of adjustable stroke, urged by a spring against the joint material.

30. The apparatus recited in claim 29, wherein the flared conduit assuring the guiding of the joint material is subjected on the inside to a jet of air which maintains the joint material substantially in an axis of symmetry of said conduit.

31. The apparatus recited in claim 16, wherein the means for removing the protective film from the joint material comprises a roller having an axis urged towards an axis of the unwinder means by spring means.

32. The apparatus recited in claim 16, wherein said means for supplying joint material comprises a spool adapted to receive said joint material and drive means for rotating the spool.

33. The apparatus recited in claim 32, further comprising a buffer reservoir for absorbing stops and starts of the drive means driving the spool in accordance with signals received from two photoelectric detectors and two position switches.

34. The apparatus recited in claim 33, wherein the buffer reservoir comprises a plurality of rollers biased by springs which create a sinusoidal path of variable amplitude for the joint material as a function of the tension exerted on the joint material.

* * * * *